US 8,458,011 B2

(12) United States Patent
Al-Dawsari et al.

(10) Patent No.: US 8,458,011 B2
(45) Date of Patent: Jun. 4, 2013

(54) DYNAMIC PRICING OF A RESOURCE

(75) Inventors: Monther Abdullah Al-Dawsari, Dhahran (SA); Hani Talal Jamjoom, White Plains, NY (US); Mark Edward Podlaseck, Warren, CT (US); Huiming Qu, White Plains, NY (US); Yaoping Ruan, White Plains, NY (US); Denis Roland Saure, New York, NY (US); Zon-yin Shae, South Salem, NY (US); Anshul Sheopuri, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 12/730,660

(22) Filed: Mar. 24, 2010

(65) Prior Publication Data

US 2011/0238460 A1 Sep. 29, 2011

(51) Int. Cl.
*G06Q 30/00* (2012.01)
*G06Q 10/00* (2012.01)

(52) U.S. Cl.
USPC .................................... 705/7.35; 705/400

(58) Field of Classification Search
USPC ...................................................... 705/7.35
See application file for complete search history.

(56) References Cited

U.S. PATENT DOCUMENTS

| 5,255,184 | A | 10/1993 | Hornick et al. |
| 5,270,921 | A | 12/1993 | Hornick |
| 5,640,569 | A | 6/1997 | Miller et al. |
| 6,009,407 | A | 12/1999 | Garg |
| 6,085,164 | A | 7/2000 | Smith et al. |
| 6,085,169 | A | 7/2000 | Walker et al. |
| 6,101,484 | A | 8/2000 | Halbert et al. |
| 6,263,315 | B1 | 7/2001 | Talluri |
| 6,526,392 | B1 | 2/2003 | Dietrich et al. |
| 6,526,935 | B2 | 3/2003 | Shaw |
| 6,567,824 | B2 | 5/2003 | Fox |
| 6,601,083 | B1 | 7/2003 | Reznak |
| 6,671,673 | B1 | 12/2003 | Baseman et al. |
| 6,934,748 | B1 * | 8/2005 | Louviere et al. ............... 709/224 |
| 2002/0055865 | A1 | 5/2002 | Hammann |
| 2002/0065699 | A1 | 5/2002 | Talluri |

(Continued)

OTHER PUBLICATIONS

Emre Celebi et al. "A Model for Efficient Consumer Pricing Schemes in Electricity Markets" IEEE Transactions on Power Systems, vol. 22, No. 1. Feb. 2007.*

(Continued)

*Primary Examiner* — John Hayes
*Assistant Examiner* — Allen J Jung
(74) *Attorney, Agent, or Firm* — Louis J. Percello; Ryan, Mason & Lewis, LLP

(57) ABSTRACT

A method of dynamic pricing of a resource is presented. For example, the method includes determining a set of anticipated demands for one or more users to acquire the resource according to uncertainty of the one or more users in preferring one or more certain time periods of a plurality of time periods for acquiring the resource. Prices for the resource differ between at least two of the plurality of time periods. Each anticipated demand of the set is associated with a different one of the plurality of time periods. The method further includes setting prices for the resource during each of the plurality of time periods according to the determined set of anticipated demands. The determining of the set of anticipated demands and/or the setting of prices are implemented as instruction code executed on a processor device.

23 Claims, 6 Drawing Sheets

U.S. PATENT DOCUMENTS

| | | | |
|---|---|---|---|
| 2002/0120492 | A1 | 8/2002 | Phillips et al. |
| 2003/0088457 | A1 | 5/2003 | Keil et al. |
| 2003/0126202 | A1 | 7/2003 | Watt |
| 2004/0249699 | A1 | 12/2004 | Laurent et al. |
| 2005/0114274 | A1* | 5/2005 | Dube et al. .................. 705/400 |

OTHER PUBLICATIONS

Search Report for TW 093134925.
A. Byde et al., "Market-Based Resource Allocation for Utility Data Centers," Hewlett Packard Tech Report, Sep. 2003, pp. 1-15.
X. Zhu et al., "Optimal Resource Assignment in Internet Data Centers," IEEE Proceedings of the Ninth International Symposium on Modeling, Analysis, and Simulation of Computer and Telecommunications Systems, Aug. 2001, pp. 61-69, Cincinnati, Ohio, USA.
R. Buyya et al., "Economic Models for Resource Management and Scheduling in Grid Computing," Concurrency and Computation: Practice and Experience, Jan. 2002, pp. 1507-1542, vol. 14.
D. Vengerov, "A Gradient-Based Reinforcement Learning Approach to Dynamic Pricing in Partially-Observable Environments," Future Generation Computer Systems 24, Feb. 2008, pp. 687-693.
G.A. Paleologo, "Price at Risk: A Methodology for Pricing Utility Computing Services," IBM Systems Journal, 2004, pp. 20-31, vol. 43, No. 1.
C.S. Yeo et al., "Pricing for Utility-Driven Resource Management and Allocation in Clusters." International Journal of High Performance Computing Applications, Winter 2007, pp. 405-418, vol. 21, No. 4.
E. Celebi et al., "A Model for Efficient Consumer Pricing Schemes in Electricity Markets," IEEE Transactions on Power Systems, Feb. 2007, pp. 60-67, vol. 22, No. 1.
S. Borenstein et al., Measuring Market Inefficiencies in California's Restructured Wholesale Electricity Market, Center for the Study on Energy Markets, University of California, Berkley, Feb. 2002.
S. Mahajan et al., "Stocking Retail Assortments Under Dynamic Consumer Substitution," Operations Research, May-Jun. 2001, pp. 334-351, vol. 49, No. 3.
Gartner Says Worldwidt IT Spending on Pace to Surpass $3.4 Trillion in 2008, Aug. 2008, 3 pages, Stamford, Connecticut.
D. Honhon et al., "Assortment Planning and Inventory Decisions Under Stock-Out Based Substitution," Working Paper, University of Texas at Austin, 2010, pp. 1-44.
U.S. Appl. No. 10/316,251, filed in the name of Eilam et al. Dec. 10, 2002.
U.S. Appl. No. 09/832,438, filed in the name of Liu et al. Apr. 10, 2001.
U.S. Appl. No. 09/559,065, filed in the name of Goldszmidt et al. Apr. 28, 2000.
U.S. Appl. No. 09/543,207, filed in the name of Kiyoshi Maruyamaon et al. Apr. 5, 2000.

* cited by examiner

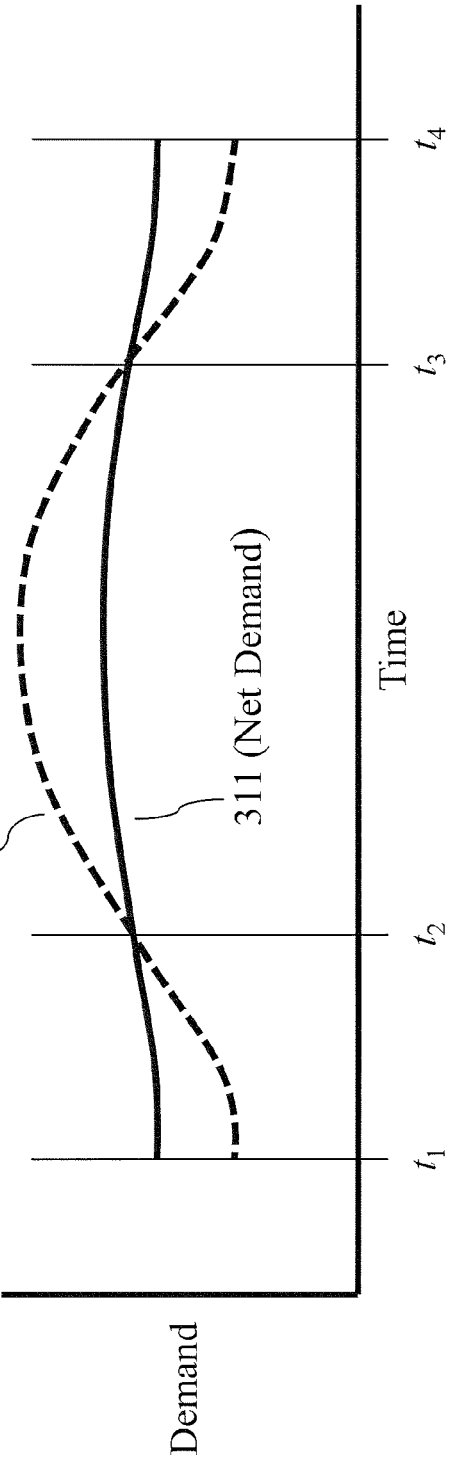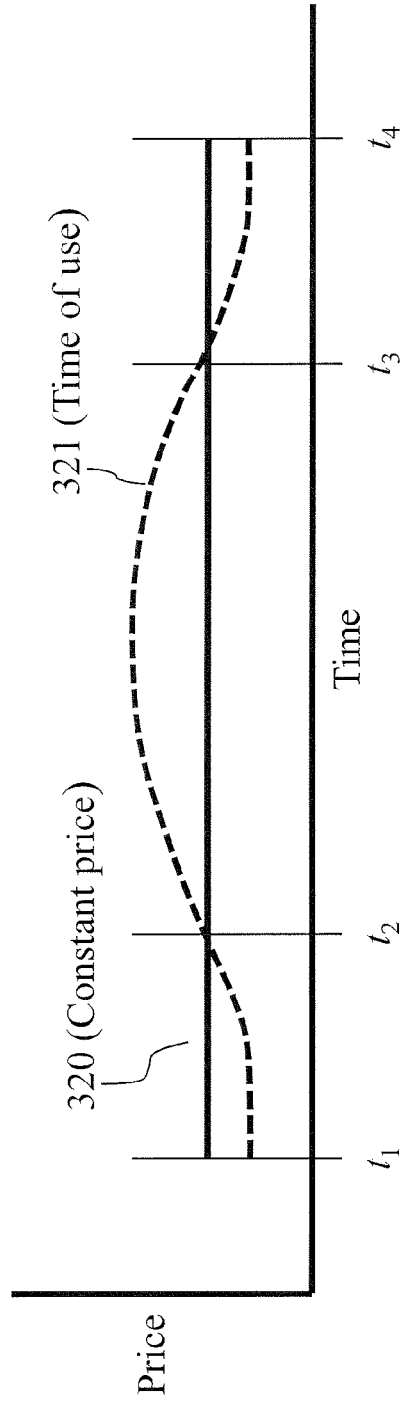

DYNAMIC PRICING OF A RESOURCE

FIELD OF THE INVENTION

The present invention relates generally to determining prices of a resource to be used or consumed by users and, more particularly, to dynamically determining prices of the resource to better match user demand for the resource with supply of the resource according to time of use of the resource.

BACKGROUND OF THE INVENTION

High-performance computing (HPC) may use supercomputers or computer clusters to solve advanced computation problems. Today, computer systems approaching teraflop performance are counted as HPC computers.

HPC is commonly associated with computing used for scientific research. A related term, high-performance technical computing (HPTC), generally refers to the engineering applications of cluster-based computing, such as the building, testing and use of virtual prototypes. Recently, HPC has come to also be applied to business use of cluster-based supercomputers, such as data warehouses, line-of-business applications, and transaction processing.

Cloud computing denotes use of remote computing resources accessed over a network that typically comprises the Internet. Cloud computing resources may be, for example, HPC or HPTC computing resources. An exemplary cloud computing resource is a HPC resource of a university where students and faculty may access the HPC resource over the Internet.

Even though HPC resources provide a high-level of computing power, demand for use of the HPC resources is often so great as to, at least sometimes, be greater that what can be provided, that is, greater than the capacity of the HPC facility to provide the computing resource to users.

Pricing of HPC resources are typically priced or allocated by unit of resource independent of time of use of the resource.

SUMMARY OF THE INVENTION

Principles of the invention provide, for example, methods, apparatus and systems for dynamic pricing of a resource.

In accordance with a first aspect of the invention, a method of dynamic pricing of a resource comprises determining a set of anticipated demands for one or more users to acquire the resource according to uncertainty of the one or more users in preferring one or more certain time periods of a plurality of time periods for acquiring the resource. Prices for the resource differ between at least two of the plurality of time periods. Each anticipated demand of the set is associated with a different one of the plurality of time periods. The method further includes setting prices for the resource during each of the plurality of time periods according to the determined set of anticipated demands. One or more of the determining of the set of anticipated demands and/or the setting of prices are implemented as instruction code executed on a processor device In accordance with a second aspect of the invention, dynamic pricing of a computer resource comprises the above method wherein the resource is the computer resource.

In accordance with a third aspect of the invention, a system for dynamic pricing of a resource is provided. The system comprises modules for implementing the above method of dynamic pricing of a resource.

In accordance with a fourth aspect of the invention, apparatus for dynamic pricing of a resource is provided. The apparatus includes a memory and a processor coupled to the memory. The apparatus is configured to perform the above method of dynamic pricing of a resource.

In accordance with a fifth aspect of the invention, an article of manufacture for dynamic pricing of a resource is provided. The article of manufacture is tangibly embodying a computer readable program code which, when executed, causes the computer to carry out the above method of dynamic pricing of a resource.

Advantageously, principles of the invention provide, for example, efficient resource allocation of computing or other resources while maximizing user satisfaction. Efficient resource allocation may include, for example, tailoring user demand for the resource so that resource allocation tends to be constant. Maximizing user satisfaction may include, for example, tailoring user demand so that demand for the resource is at or less than the availability to provide the resource, or that demand for over-capacity resource allocation is minimized.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 3A illustrates a graph of demand for a resource according to time and according to an embodiment of the invention.

FIG. 3B illustrates a graph of price of the resource of FIG. 3A according to time and according to an embodiment of the invention.

DETAILED DESCRIPTION OF THE INVENTION

Figure 1:
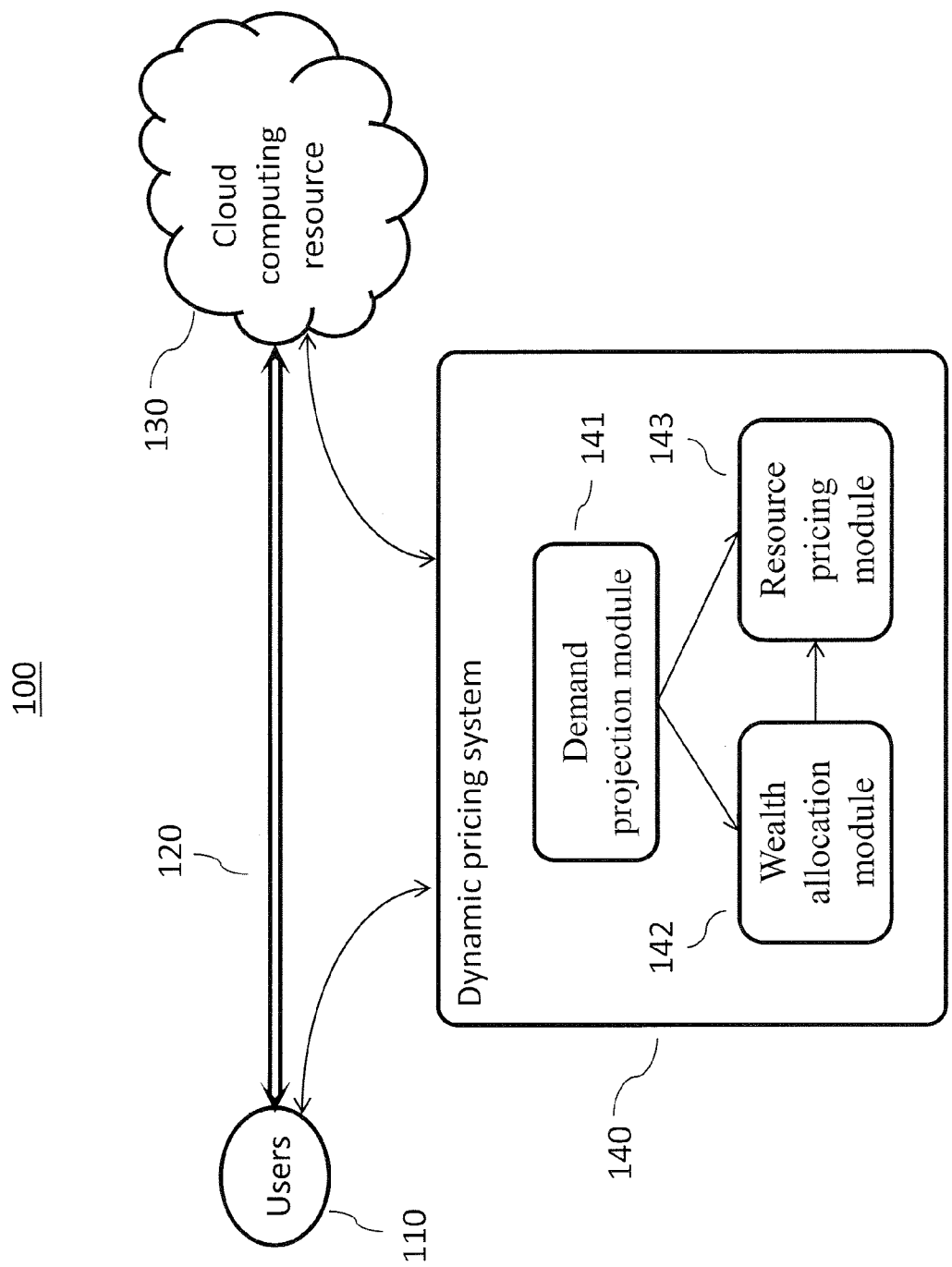
FIG. 1 illustrates a system for dynamically pricing of cloud computing resources for use or consumption by users according to an embodiment of the invention.

Principles of the present invention will be described herein in the context of illustrative embodiments of methods, apparatus and systems for dynamic pricing of resources. It is to be appreciated, however, that the principles of the present invention are not limited to the specific apparatus, systems and methods illustratively shown and described herein. Rather, the principles of the invention are directed broadly to techniques related to pricing of resources. For this reason, numerous modifications can be made to the embodiments shown that are within the scope of the present invention. That is, no limitations with respect to the specific embodiments described herein are intended or should be inferred.

The term resource, as used herein, is any physical or virtual entity of limited availability. In many cases, commercial or ethical factors may require, for example, resource allocation through resource management. A resource may be, for example, a computing or computation resource, such as, for example, computation operations of the computing resource.

The term cloud computing, as used herein, implies Internet based development and use of computing resources and technology. The term cloud computing resources, as used herein, refers to computing resources associated with cloud computing and includes remote computing resources available to users over the Internet. In concept, some details of the cloud computing resources may not be known by those using the cloud computing resources (i.e., users). Those using the cloud computing resources, for example, may no longer need knowledge of, expertise in, or control over technology infrastructure used. Cloud computing describes a relatively new supplement, consumption and delivery model for information technology (IT) services based on the Internet. Cloud computing typically involves, for example, the provision of dynamically scalable and often virtualized resources as a service over the Internet. The term cloud is used as a metaphor for the Internet and Internet provided services, based on cloud drawings sometimes used to depict the Internet and related resources in computer network diagrams as an abstraction of the underlying infrastructure it represents (see FIG. 1). Typical, cloud computing providers may deliver, for example, common business applications online which may be accessed from a web browser while the software and data are stored on servers of the cloud computer. By way of example only, a university may be a cloud computing provider, providing cloud computing resources to users who are students, faculty or administrators. The users may access the cloud computing resources over the Internet. Cloud computing resources as well as other computing resources (e.g., HPC resources) may include, for example, one or more processing device coupled to a memory.

The term time of use pricing, as used herein, means that the pricing of a resource may be according to time, that is, the pricing of the resource may result in the price (time of use price) of a resource being different at different times or during different time periods during which the resource is provided, obtained or used. By way of example only, the price of the resource may be different at different times or during different time periods of a day. Additionally or alternately, the price of the resource may be different at different times or during different time periods of a week or a year.

Consider an example where the pricing of a resource results in a price of a resource that is according to time of day, day of the week and month of the year. In this example, the resource may be a cloud computing resource of a university. From 8 am to 7 pm, the price of a computing resource is higher than from 7 pm to 8 am; during Monday through Friday, the price of the computing resource is higher than during Saturdays and Sundays; and from September through December and from February through May, the price of the computing resource is higher than from June through August and during January.

Time of use pricing may, for example, minimize the expected number of customers (e.g., users or consumers of the resource) that do not get the resource at customer specified preferred times, maximize use or consumption of the resource up to a capacity for providing the resource while minimizing the demand for the resource above the capacity to supply the resource, and/or follow practices for fair pricing.

The term constant price, as used herein, means that the price of a resource does not vary over a time period of consideration (e.g., a day, a week, a month or a year). Note that a constant price may be set from time to time (e.g., at the end of the period of consideration) resulting in the price of the resource changing. A constant price is set according to methods of fixed pricing. As opposed to a variable price (e.g., a time of use price), a constant price does not have predetermined time-dependent prices. Prices, whether constant or variable, may be expressed in, for example, dollars, other government provided currencies or spendable units other than currencies (e.g., tokens allotted to users and spendable for an amount of the resource). Payment for the resources may be made in advance (pre-paid) of receiving the resource, for example, prior to or at the time of allocation of the resource, or be made after allocation and/or consumption of the resource (post-paid).

By the extreme value theorem, a generalized extreme value distribution (GEV distribution) is a limit distribution of properly normalized maxima of a sequence of independent and identically distributed random variables. Because of this, a GEV distribution may be used as an approximation to model the maxima of long (finite) sequences of random variables. GEV distributions are known in the art.

A Gumbel distribution is a type (sometimes called type I) of GEV distributions. The Gumbel distribution may be used to model the distribution of the maximum (or the minimum) of a number of samples of various distributions. For example, a Gumbel distribution may be used to represent the distribution of the maximum level of a river in a particular year if a list of maximum values for the past ten years was known. The potential applicability of a Gumbel distribution to represent the distribution of maxima relates to extreme value theory which indicates that it is likely to be useful if the distribution of the underlying sample data is of the normal or exponential type. Gumbel distributions are known in the art.

Because demand for a resource may at times be greater than the capacity of providing the resource, a method of efficiently providing the resource to users (e.g., customers) in a way that provides utility and satisfaction to the users is advantageous. Pricing of the resource may, for example, provide a technique for tailoring user demand in order to maintain demand at or below a capacity to provide the resource while providing near maximum possible utility to the users and thus promote user satisfaction. Use of a computing resource is an example of providing a resource having limited capacity where demand for the capacity can be tailored by pricing mechanisms.

FIG. 1 illustrates a system 100 for dynamically pricing of cloud computing resources 130 for use or consumption by users 110 according to an embodiment of the invention. System 100 is accessed by users 110 and comprises the cloud computing resources 130, dynamic pricing system 140, and Internet 120 coupling the users 110 to the cloud computing resources 130. Users 110 may include user computing resources, for example, clients, workstations, mobile computing devices, local area networks and/or wireless local area networks. The dynamic pricing system 140 is coupled to the users 110 and to the cloud computing resource 130. The dynamic pricing system comprises a dynamic projection module 141, a wealth allocation module 142 and a resource pricing module 143. The dynamic projection module is coupled to the wealth allocation module 142 and to the resource pricing module 143. The wealth allocation module 142 is further coupled to the resource pricing module 143.

Figure 2:
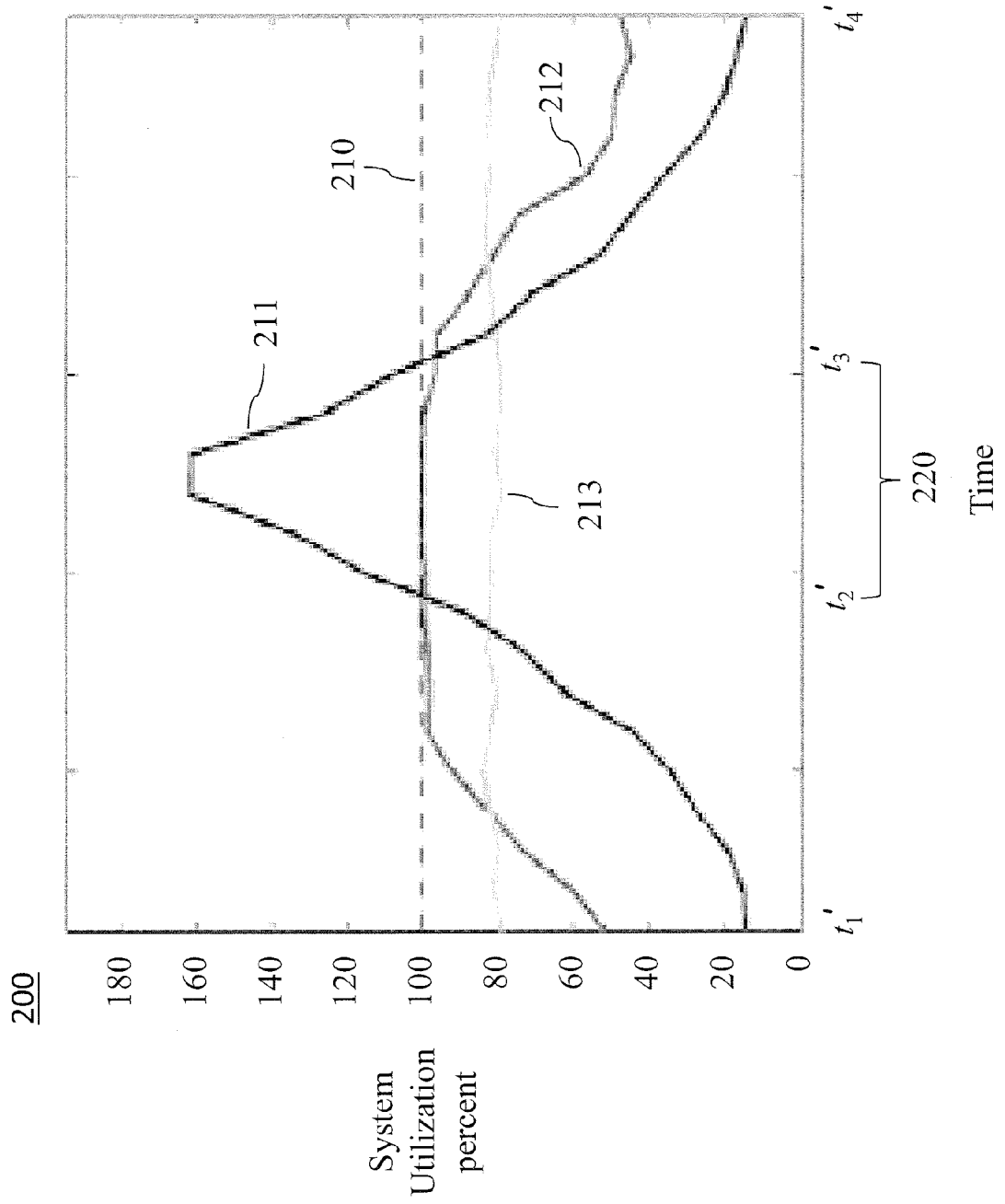
FIG. 2 illustrates a graph of system utilization of, for example, a cloud computing resource according to time and according to an embodiment of the invention.

According to an embodiment of the invention, FIG. 2 illustrates a graph 200 of system utilization (e.g., system utilization of the cloud computing resource 130) according to time. By way of example only, the time axis of graph 200 may represent a 24 hour period of a day, starting from 12:00 midnight (i.e., $t_1'=12:00$ midnight and ending at 12:00 the following midnight (i.e., $t_4'=t_1'+24$ hours). For example, the 24 hour period represented on the time axis may represent an average day with system utilization averaged over a number of days (e.g., Monday through Fridays for a plurality of weeks). The system utilization is expressed as percent capacity for the system providing the resource. The system can utilized up to one-hundred percent of capacity. The dashed line 210 represents one-hundred percent system utilization (use of one-hundred percent of system capacity). Trace 211 shows an example of system utilization demand by the users (i.e., user demand for the system resource) over time. In this example, the user system utilization demand shown by trace 211 corresponds to the pricing of the resource being fixed at some single value over time (i.e., fixed pricing resulting in a constant price). For an interval of time 220, the demand is greater than one-hundred percent of system utilization or system capacity and cannot be meet. Trace 212 shows an example of actual system utilization that may result from the system utilization demand of trace 211. Note that at least some of the demand during the interval of time 220 is transferred to other times outside of the interval of time 220. Thus, trace 212 shows an example of actual system utilization for fixed pricing. Trace 213 shows system utilization corresponding to an example of time of use pricing of the resource. In this case, the resource is priced so that the price is higher form $t_2'$ to $t_3'$ than the price form before $t_2'$ and after $t_3'$. The price differential associated with the time of use pricing moves demand from $t_2'$ to $t_3'$ to before $t_2'$ and after $t_3'$, resulting in a more constant system utilization of about 80% in this example.

The graph 200 of FIG. 2 may be obtained, formed or outputted from, for example, the demand projection module 141. The graph 200 may result from simulation using demand and/or pricing models (e.g., fixed pricing or time of use pricing models). Demand may be modeled according to historical data, for example, projecting future or anticipated demand according to past historical data. Additional demand factors may be used. For example, an additional demand factor may scale historical demand according to current or projected future economic considerations.

Pricing is an efficient mechanism to allocate scarce resources. With dynamic pricing (e.g., time of use pricing), users that are willing and able to pay a higher price for the resource may be allocated the resource. Dynamic pricing may be a mechanism to provide incentives to users to achieve certain objectives (e.g., objectives set by the resource provider). Achievable objectives of dynamic pricing may include, for example, revenue or profit increase or maximization (e.g., revenue or profit increase or maximization of the resource provider) and/or customer satisfaction increase or maximization. By way of example only, dynamic pricing may modify or shape user (e.g., customer) time-dependent demand for efficient resource allocation while increasing or maximizing user satisfaction and/or provider revenue.

User or customer satisfaction may comprise or be measured according to, for example, the percentage of customers that are given requested resources at the requested times, given the variable resource pricing. Another example of user satisfaction or a measurement thereof comprises dividing the resource into units, each unit comprising a predetermined amount of the resource (e.g., an amount of computing power, operations, instructions, clock cycles or other computing resource). The total amount of the resource is the sum of the units. Each unit may be assigned a specific time or time interval for allocating or providing the resource to the user. User satisfaction may be evaluated according to the percentage of user requested units at user requested times allocated or provided to users (e.g., considering variable pricing of the resource units).

According to an embodiment of the invention, FIG. 3A illustrates a graph 301 of demand for a resource according to time. According to an embodiment of the invention, FIG. 3B illustrates a graph 302 of price of a resource according to time. The demand for the resource shown in graph 301 corresponds to the time-variant price for the resource shown in graph 302. By way of example only, the time axes of graphs 301 and 302 may represent a 24 hour period of a day, starting from 12:00 midnight (i.e., $t_1$=12:00 midnight and ending at 12:00 the following midnight (i.e., $t_4=t_1+24$ hours). For example, the represented 24 hour period may represent an average day with demand averaged over a number of days (e.g., Monday through Fridays for a plurality of weeks).

Fixed pricing provides a price for the resource constant over time for the time period of consideration (i.e., a constant price). Graph 302 shows a constant price 320 for the resource. An example of demand for the resource that may result from the constant price 320 is shown in graph 301 as demand intensity 310. In this example, the demand intensity 310 varies over time (time variant). As shown by curve 211, demand intensity corresponding to a constant price may, for example, be greater that the capacity to provide the resource (e.g., the system utilization that would be necessary to meet the demand intensity is greater than one-hundred percent).

Time of use pricing may be used to modify user demand for the resource so that the demand is more constant over time, for example, the demand is at or below one-hundred percent of system utilization or capacity over the entire 24 hour interval. Graph 302 shows a time of use price 321 for the resource. During times of peak demand intensity 310 ($t_2$ to $t_3$), the price of the resource is higher than during times of off-peak demand intensity ($t_1$ to $t_2$ and $t_3$ to $t_4$). An example of demand for the resource that may result from the time of use price 321 is shown in graph 301 as net demand 311. In this example, the net demand 311 varies less over time than the demand intensity 310. For example, at all times the net demand 311 may be at or less than the capacity to provide the resource. The net demand 311 is less that the demand intensity 310 during the times of peak demand intensity 310, and, in this example, is greater than the demand intensity 310 during the times of off-peak demand.

As previously mentioned, a resource may be divided into units for providing to users, each unit comprises a predetermined amount of the resource. The total amount of the resource is the sum of the units. Each unit may be assigned a specific time or time interval for allocating or providing to the user. User satisfaction may be evaluated according to the percentage of user requested units at user requested times are allocated or provided to users (e.g., considering variable pricing of the resource units).

Figure 4A:
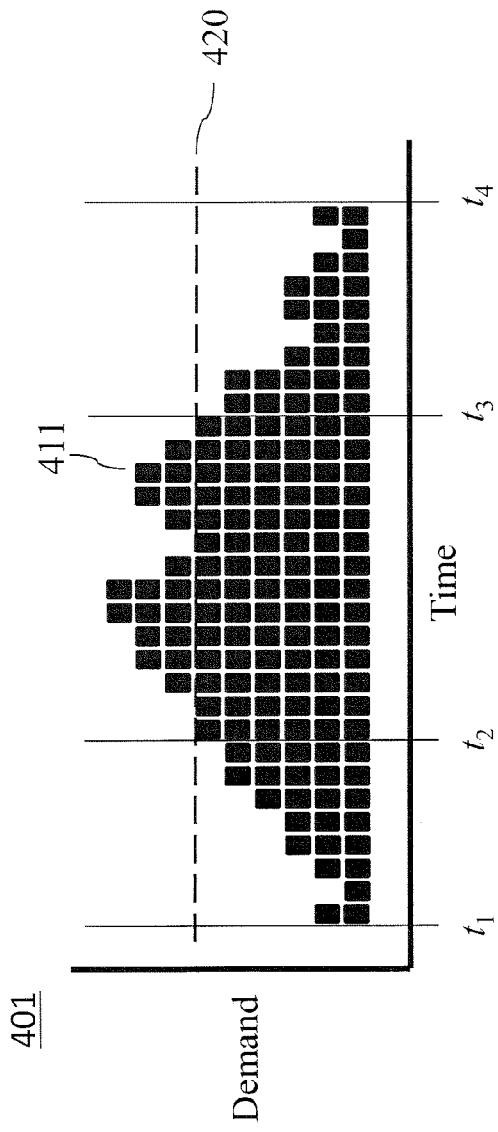
FIGS. 4A and 4B illustrates illustrate user demands and allocation of a resource according to an embodiment of the invention.

FIGS. 4A and B illustrate user demands and allocation of a resource according to an embodiment of the invention. As in FIGS. 3A and B, user demand corresponding to constant price and variable price of a resource are presented. Allocation is only presented for the variable priced resource.

FIG. 4A illustrates user demand for constant priced units 411 of a resource and corresponding times for user requested allocation of the constant priced units 411 according to an embodiment of the invention. The constant priced units 411 have a predetermined price (e.g., the constant price 320) that is the same for all units, regardless of the time at which the units are to be used (i.e., delivery or availability). Graph 401 of FIG. 4A is a demand according to time graph 401 of all requested constant priced units 411 requested by users and the shows the times at which each requested constant priced unit 411 is requested for provisioning (i.e., delivery or availability). Dashed line 420 corresponds to the capacity for delivering the resource, that is, the dashed line 420 represents one-hundred percent system utilization or use of one-hundred percent of system capacity of the resource.

Figure 4B:
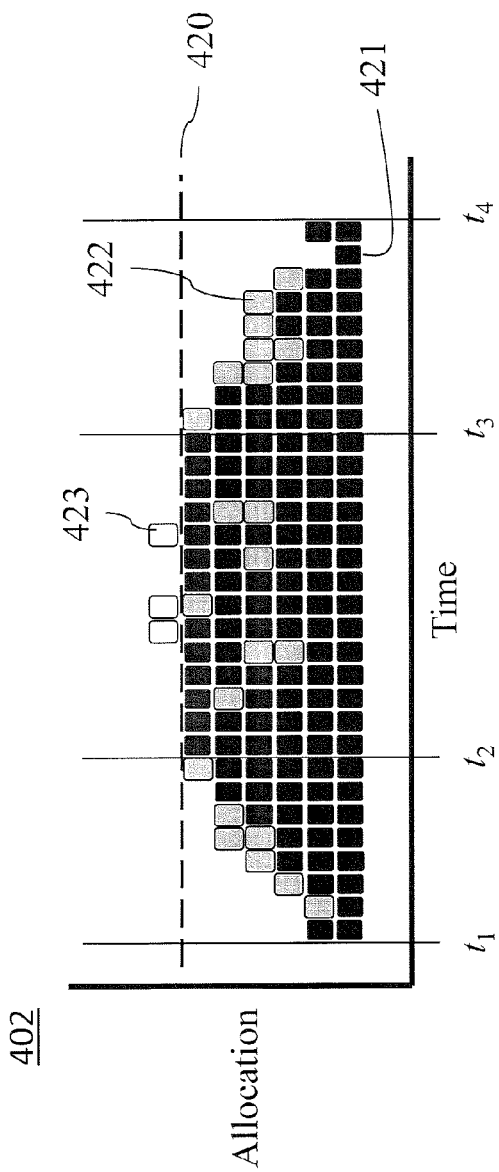

FIGS. 4A and B illustrates user demand and resulting allocation to users for variable priced units of the resource and corresponding requested and actual allocation times for the variable priced units according to an embodiment of the invention. The variable priced units have a price (e.g., time of use price 321) that is the not the same for all units but varies according to the time at which the units are to be used (i.e., delivery or availability). Therefore, the variable priced units may be considered time of use priced units. Graph 402 of FIG. 4B is a demand/allocation according to time graph for request and allocation of the variable priced units. The requesting, allocation and provisioning of the variable priced units is according to time. Dashed line 420 corresponds to the capacity for delivering or using the resource, that is, the dashed line 420 represents one-hundred percent system utilization or use of one-hundred percent of system capacity for the resource. Some of the provided variable priced units, provided variable priced units 421, remain requested and are allocated at the requested times for the constant priced units 411 and, therefore, correspond to constant priced units 411 having the same times of provisioning. Others of the provided variable priced units, provided units 422, are now requested to be provided at times different from the requested times of the corresponding constant priced units 411 and, therefore, correspond to constant priced units 411 provided at different times than had been requested for the constant priced units 411. Finally, some of the originally requested constant priced units 411 are still requested at times of full allocation ($t_2$ to $t_3$). This may be, for example, because the potential users requesting these units were not able to switch to off-peak times ($t_1$ to $t_2$ and $t_3$ to $t_4$). Such above-capacity variable priced units that are requested at times of full allocation and that cannot be provided because of lack of capacity are shown in graph 402 as variable priced units 423.

An exemplary measure of user or customer satisfaction is the ratio of the number of allocated and/or provided variable priced units (i.e., the sum of variable priced units 421 and variable priced units 422) to the number of requested variable priced units (i.e., the sum of variable priced units 421, variable priced units 422 and variable priced units 423). Another exemplary measure of user or customer satisfaction is the ratio of the number of requested constant priced units 411 to the number of allocated and/or provided variable priced units. The latter measure takes into account dropped requests for units.

The demand corresponding to a constant price of the resource (graph 401) may be formed or obtained by, for example, the demand projection module 141. In this case, the users may be unaware of the constant price and may not be offered the resource at the constant price. The price published or provided to users may be only the variable or time of use price. That is, the user is provided with prices corresponding to different times or different time intervals. By way of example, the users may be provided with a higher price for resources (e.g., units) provided during the time interval $t_2$ to $t_3$ and a lower price for resources provided during the time intervals $t_1$ to $t_2$ and $t_3$ to $t_4$.

Objectives of dynamic pricing may include increasing or maximizing composite utility to users of the resource. The composite utility comprises the utility for each of the users, for example, an average of the utility for each of the users. The utility for each of the users may be or include, for example, any one or more of the exemplary measures of user or customer satisfaction presented herein. A model of utility to a user may comprise, compute or be used to compute, for example, the one or more of the exemplary measures of user or customer satisfaction presented herein. The model of utility to the user may be, for example, for use of the resource during each of the times or time periods that units of the resource are offered. The model of utility may include, compute or be used to compute, for example, the utility or desirability to the user of using the resource during each of the times or time periods, for example, the chances that the user will obtain allocation of units requested at specific times or time periods.

Figure 5:
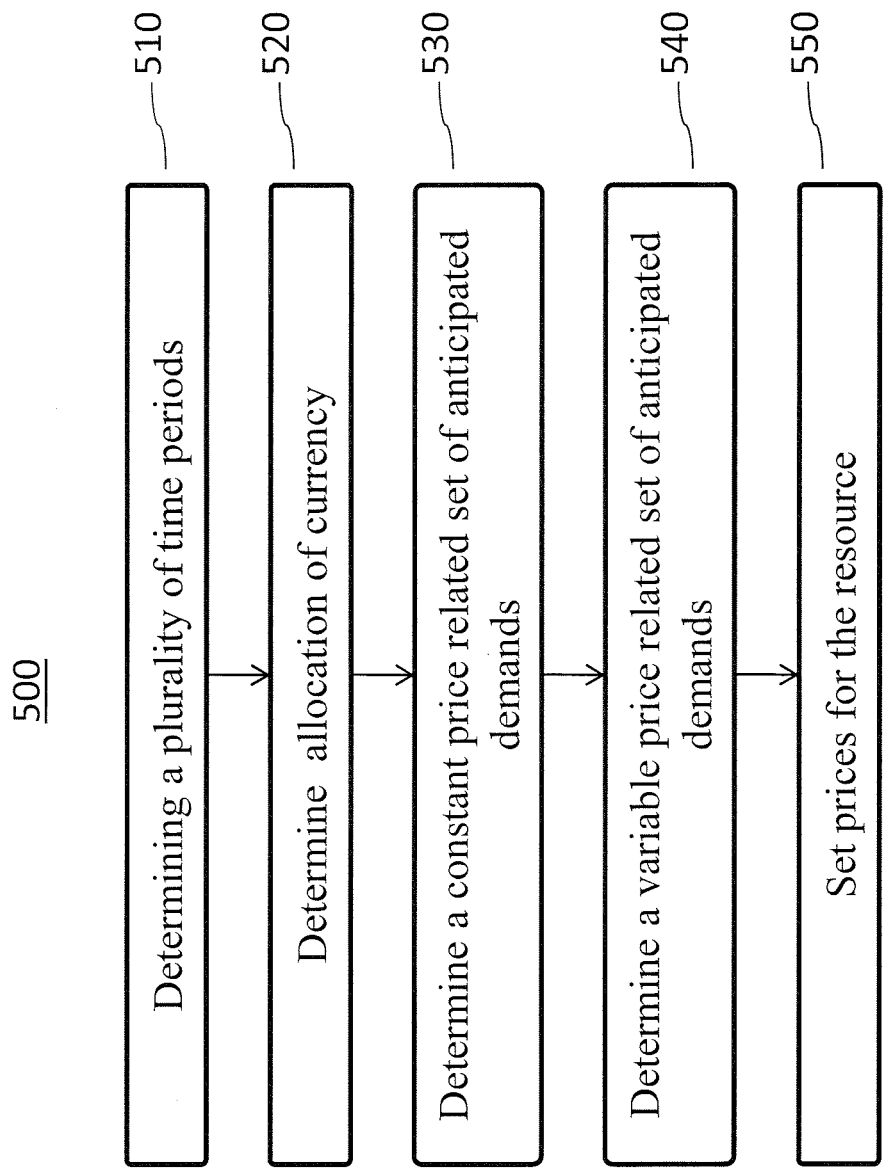
FIG. 5 is a flow diagram of a method for dynamic pricing of a resource according to an embodiment of the invention.

FIG. 5 is a flow diagram of a method 500 for dynamic pricing of a resource according to an embodiment of the invention. One or more of the steps of method 500 may be, for example, implemented as instruction code executed on a processor device (e.g., a processor device coupled to a memory).

Step 510 comprises determining or selecting a plurality of time periods during which the resource will be available for consumption or use by users. The resource may be allocated to the users according to units (e.g., variable priced units 421 or constant priced units 411) of the resource that comprise a specific amount of the resource during one of the time periods.

By way of example only, dynamic pricing of a resource comprises time of use pricing of a cloud computing resource at a university. The users, in this example, may include students, faculty administrators. Payment for the resource may be pre-paid using tokens that are divided up among the users and provided to the users at the beginning of a semester for use during the semester. The dynamic pricing may take into account cloud computing system utilization levels according to methods of the invention.

Specifically, the resource comprises computation on a cloud computer (e.g., cloud computing resource 130; a high performance cloud (HPC) computer). The cloud computer is available to the user over the Internet (e.g., Internet 120). A twenty-four hour day is divided into ninety-six fifteen minute periods. The ninety-six fifteen minute periods are the determined plurality of time periods. A unit of computing resource comprises a specific amount of computing during any one of the fifteen minute periods. Computing capacity or computer system utilization of the cloud computer is limited, at any given time, to one-hundred percent of capacity or system utilization (e.g., as indicated by dashed lines 210 and 420 of FIGS. 2 and 4, respectively). In this example, the computing capacity is constant (i.e., does not change with time) during the twenty-four hour period. At any time, one-hundred percent of capacity is represented by one hundred units, that is, the cloud computer is capable of executing one-hundred times the specific amount of computing provided by a unit. Thus, there are ninety-six hundred units for available within the day.

Step 520 comprises determining allocation to each user of a group of users of a currency or wealth to purchase the resource. The allocation may be determined by, for example, the wealth allocation module 142. In determining allocation, the wealth allocation module 142 or a manager of the resource may, for example, be constrained to consider a fair price scheme. In a fair price scheme, for example, the average price paid for the resource by any user approximately matches the budget for the average user resource request. For example, all users could be budgeted the same amount of currency. For another example, all users could be budgeted the same price per unit of resource under the assumption that the time distribution of purchased units of resource is the same for all users. The wealth or currency allocated to a user may, for example, be set or adjusted to satisfy the average requirement of the user. Wealth or currency may be periodically allocated or reallocated to balance supply of the resource and user demand for the resource. The demand may be actual demand presented by the group of users and/or predicted or determined anticipated demand from the group of users. The currency may be, for example, tokens or dollars allocated or allowed to purchase portions (units) of the resource.

Continuing with the above example, the group of users consists of one-hundred users who have requested computing resources of the cloud computer. The manager of the cloud computer has established 9600 tokens as a currency to distribute to the users so that the users can purchase units. The manager has decided to distribute the tokens equally among the one-hundred users, each user receiving 96 tokens to be used for purchasing unit of the computing resource. Instead of tokens, an official currency such as United States dollars could have been used to purchase units. In this case, the manager may determine to let each user spend a specific amount of dollars to purchase units.

Step 530 comprises determining a set of anticipated demands by the group of users for the resource when a price (i.e., a constant price) of the resource is the same for all of the plurality of time periods. This set of anticipated demands is called a constant price related set of anticipated demand. The constant price related set of anticipated demands may be determined by the demand projection module 141. Each of the anticipated demands of the constant price related set is for one of the plurality of time periods (i.e., a different one of the plurality of time periods).

Continuing with the above example, the manager simulates the user demand for the computing resource for each of the 96 fifteen-minute time periods assuming that each unit costs one token, regardless of the time period that the unit corresponds to. In this example, the simulations predict that between 1 pm and 7 pm user demand will be 30% above capacity and before 1 pm and after 7 pm user demand will be 10% below capacity. Note that the demand is limited to 9600 units because there are 9600 tokens available. Therefore, a total of 6480 units are predicted to be requested for before 1 pm and after 7 pm and 3120 units are predicted to be requested for between 1 pm and 7 pm. The manager notes that the cloud computer will be able to provide only 8880 requested units and not able to provide 720 requested units (units requested above capacity from 1 pm to 7 pm). The manager calculates that the average system utilization could be 92.5% of capacity and that 92.5% of user requested units could be provided Step 540 comprises determining a variable price related set of anticipated demands by the group of users for the resource when prices for the resource differ between at least two of the plurality of time periods. The variable price related set of anticipated demands may be determined by the demand projection module 141. Each of the anticipated demands of the variable price related set is for one of the plurality of time periods (i.e., a different one of the plurality of time periods). The determining of the variable price related set of anticipated demands may be, for example, according to a model of utility to one or more users for use of the resource during each of the time periods. The model of utility may, for example, indicate the utility or the desirability to the one or more users of using the resource during the each of the time periods. The model of utility to the one or more users may comprise, compute or be used to compute, for example, the one or more of the exemplary measures of user or customer satisfaction presented herein. The constant price related set of anticipated demand determined in step 530 may optionally be determined according to the model of utility.

The model of utility models user preferences over the different time periods and is associated with maximizing utility to users. In a process of users reserving time periods for acquiring the resource, it is assumed that each user implicitly or explicitly assigns utility to each time period of the plurality of time periods, and will select the one or more time periods, among those that are still available, that provide the user with the highest utility. The utility may include a random component.

The exemplary model of the utility may comprises for each of a plurality of time periods: (i) a desirability factor of using the resource during the associated time period regardless of price for the resource; (ii) a price factor comprising the price for the resource during the associated time period; and/or (iii) an uncertainty factor comprising the uncertainty of users in preferring one or more certain time periods of the plurality of time periods for acquiring the resource. The uncertainty factor may be or may comprise, for example, a randomness factor. The randomness factor may be associated with random uncertainty of one or more users of the group of users in preferring one or more certain periods. The randomness factor may, for example, comprise a component for each of the plurality of time periods.

This exemplary model of utility may be expressed as:

$$U_n(t) = \mu_t - p_t + \xi_{n,t}, \qquad \text{EQ. 1}$$

wherein n is an index indicating the user, t is an index indicating the one of the plurality of time periods, $U_n(t)$ is the utility for user n during time period t, $\mu_t$ is the desirability factor, $p_t$ is the price factor, and $\xi_{n,t}$ is the randomness factor. $\mu_t$ may comprise, for example, a demand intensity factor. $\xi_{n,t}$ may be or include, for example, a Gumbel distributed random variable. Thus, the uncertainty of the one or more users in preferring one or more certain time periods of a plurality of time periods may be modeled, for example, according to a Gumbel distribution.

Including price dependency in user utility is justified by the assumption that users are rational, in the sense that they consider inter-temporal consequences of decisions. For example, paying a high price for reserving one time slot (e.g., a time slot of today) will decrease the budget to obtain a future time slot (e.g., a time slot of tomorrow), which may limit overall user utility.

User utility maximizing behavior should be compatible with budget constraints of the user. However, a decision of a user may be, at least in part, determined by the realization of random terms on utility of the decision. Such a decision may be made regardless of budget considerations. Such behavior may be justified when heterogeneity in user preferences through time leads to an overall balance between budget and allocation. For example, users can adopt a utility maximizing behavior as long as this does not result in average allocation spending above the predefined budget. It is assumed that, if, for example, the budget is allocated in a weekly or monthly basis, users are allowed to trade currency (e.g., tokens) among themselves to cover short term (e.g., daily) needs, as long as the total currency balance remains positive.

Continuing with the above example presented in steps 510-530, the manager notes that form 1 pm to 7 pm there are 24 fifteen minute time periods which is 25% of the total number of time periods (96) and that before 1 pm and after 7 pm there are a total of 72 fifteen minute time periods. The manager sets the price of a unit (unit price) to be used between 1 pm and 7 pm at two tokens per unit and sets the unit price for units to be used before 1 pm or after 7 pm at two-thirds of a token per unit. The manager then simulates the user demand for the computing resource for each of the 96 fifteen-minute time periods given the above time-dependent pricing of the units. In this example, the new simulations predict user demand averages 97% of capacity before 1 pm and after 7 pm, and is at 100% of capacity between 1 pm and 7 pm with the exception of four time periods during this interval where the user demand is somewhat above 100%, averaging 110% percent of capacity for those four time periods. The manager notes that the simulated demand predicts that the total number of units demanded is 9424 units, indicating that total user demand dropped by almost 2% (176 units) below the available 9600 units because users would not be able to obtain units at previously predicted (i.e. predicted with constant priced units) preferred times. Additionally, it is noted that the user demand that is predicted to exceed 100% during the four time periods (a total of 40 units) will not be met.

Given the anticipated variable price related set of anticipated or future demands for the resource, the manager may optionally adjust the differential pricing of the resource over the time periods in order to bring predicted future (anticipated) demand more in line with capacity and then determine a third set of anticipated demands for the resource. Iteration of differential price adjustments and determining future demand may continue until the manager is satisfied with optimization of, for example, resource unitization (e.g., utilize a desired percentage of the resource) and/or user utility or satisfaction (e.g., any one or more of the exemplary measures of user or customer satisfaction presented herein).

Step 550 comprises setting prices for the resource during each of the plurality of time periods. The prices may be set by, for example, the resource pricing module 143. Prices, once set, may be published or otherwise made available to users. The prices are set according to the variable price related set of future demands and may optionally also be set according to the constant price related set of future demands. The prices for the resource may also be set according to: (i) increasing or maximizing the number of users that receive the resource during a user desired one or more of the plurality of time periods; (ii) increasing or maximizing the fulfillment rate (e.g., percent fulfillment) of user requests for the resource during a specific time period of the plurality of time periods; (iii) increasing or maximizing the average system utilization as a percent of capacity; (iv) increasing or maximizing revenues obtained for providing the resource; and (v) increasing or maximizing profits obtained for providing the resource. The user desired one or more of the plurality of time periods may be expressed by the model of utility to a user for use of the resource during each of the time periods, for example, the model expressed in EQ. 1.

Continuing with the above example, the manager desires to, within limits, maximize the percent of capacity used by the users, and to, within limits, maximize customer satisfaction by, within limits, maximizing the percentage of units requested by users that are allocated or provided to the users. Considering the results of the simulations producing the constant price related and variable price related sets of future demands, the manager determines that over the twenty-four hour interval 9384 units will be used (9600-216 units) and that the average system utilization is, therefore, 97.75% of capacity. Further considering the results of the simulations producing the constant price related and variable price related sets of future demands, the manager further determines that the cloud computer will be able to provide 9384 customer requested units but not be able to provide 40 customer requested units and, therefore, that 99.6% of user requested units will be provided.

The manager recalls that the constant price related set of anticipated demands resulted in 92.5% system utilization and 92.5% user satisfaction or utility as measured by the percent of user requested units that could be provided. The manager notes that pricing units used before 1 pm or after 7 pm at two-thirds of a token per unit and pricing units used between 1 pm and 7 pm at two tokens per unit results in an increase in the average system utilization as a percent of capacity and an increase in user satisfaction or utility as compared to average system utilization and user satisfaction with constant pricing of one token per unit. Furthermore, the manager observes that a previously set goal of at least 97% system utilization of capacity and customer satisfaction at least 99% are predicted to be met with differential pricing of units associated with the variable price related set of anticipated demands. Therefore, the manager sets the price of the units at two-thirds of a token per unit for units used before 1 pm or after 7 and at two tokens per unit for units used between 1 pm and 7 pm.

Note that in the above example, the anticipated demands of the constant price related set of anticipated demands during the time periods from 1 pm to 7 pm are greater than capacities of the cloud computer for providing the computing resource during the time periods from 1 pm to 7 pm. Further note that the setting of the prices (step 550) reduces anticipated demand from the above capacity anticipated demands from 1 pm to 7 pm (constant price related set of anticipated demands) to be equal to or less than the capacity of the cloud computer in 20 of the 24 time periods between 1 pm and 7 am.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 5, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-5, can also include, as described herein, providing a system, wherein the system includes distinct modules (e.g., modules comprising software, hardware or software and hardware). By way of example only, the modules may include but are not limited to a demand projection module operative to determine a variable price related set of anticipated demands for one or more users to acquire a resource according to uncertainty of the one or more users in preferring one or more certain time periods of a plurality of time periods for acquiring the resource. The prices for the resource differ between at least two of the plurality of time periods. Each anticipated demand of the variable price related set is associated with a different one of the plurality of time periods. By way of further example only, the modules may include but are not limited a resource pricing module operative to set prices for the resource during each of the plurality of time periods according to the determined variable price related set of anticipated demands. These and other modules may be configured, for example, to perform the steps of described and illustrated in the context of FIGS. 1-5.

Figure 6:
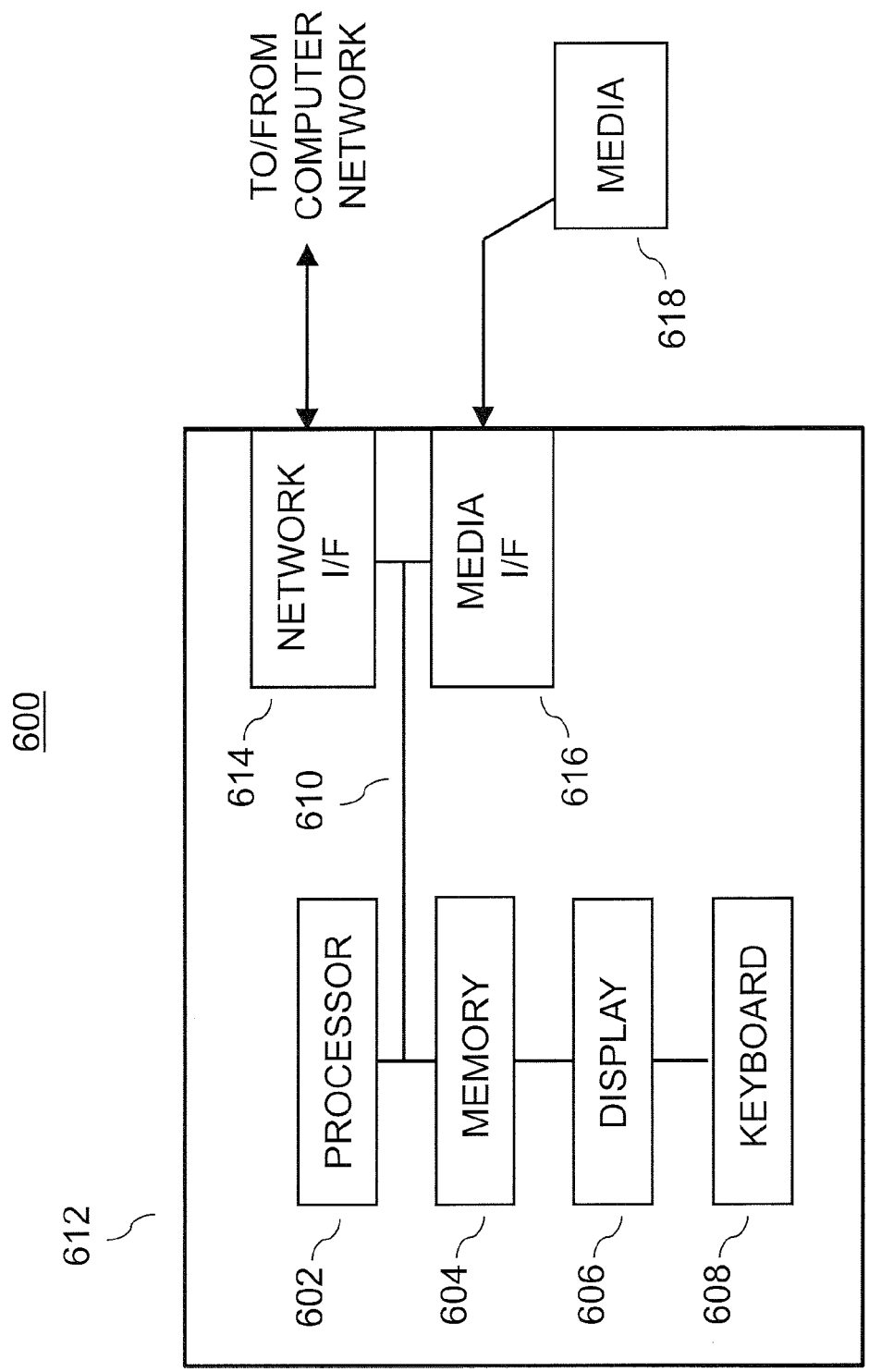
FIG. 6 depicts a computer system that may be useful in implementing one or more aspects and/or elements of the invention.

One or more embodiments can make use of software running on a general purpose computer or workstation. With reference to FIG. 6, such an implementation 600 employs, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 602, memory 604, and input/output interface such as display 606 and keyboard 608 can be interconnected, for example, via bus 610 as part of a data processing unit 612. Suitable interconnections, for example, via bus 610, can also be provided to a network interface 614, such as a network card, which can be provided to interface with a computer network, and to a media interface 616, such as a diskette or CD-ROM drive, which can be provided to interface with media 618.

A data processing system suitable for storing and/or executing program code can include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 608, display 606, pointing device, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

It is understood that even though specific embodiments and examples presented herein relate to, for example, the dynamic pricing of a single resource, embodiments of the invention are not so limited. Techniques and embodiments of the invention may, for example, address dynamic pricing for a plurality of resources.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of dynamic pricing of a resource, the method comprising:
   determining a first set of anticipated demands for one or more users to acquire the resource according to uncertainty of the one or more users in preferring one or more certain time periods of a plurality of time periods for acquiring the resource, wherein prices for the resource differ between at least two of the plurality of time periods and each anticipated demand of the first set is associated with a different one of the plurality of time periods;
   determining a second set of anticipated demands for the one or more users to acquire the resource when a constant price for the resource is the same for all of the plurality of time periods, each anticipated demand of the second set is associated with a different one of the plurality of time periods; and
   setting prices for the resource during each of the plurality of time periods according to the determined first set of anticipated demands and the determined second set of anticipated demands;
   wherein one or more of the determining of the first set of anticipated demands and the setting of prices are implemented as instruction code executed on a processor device;
   wherein one or more anticipated demands of the second set associated with one or more of the plurality of time periods is greater than one or more capacities for providing the resource during the one or more of the plurality of time periods; and
   wherein the setting of the prices reduces anticipated demand from the one or more anticipated demands of the second set to be equal to or less than the one or more capacities.

2. The method of claim 1, further comprising determining the plurality of time periods.

3. The method of claim 1, further comprising determining an amount of currency to purchase resource to be allocated to the one or more users according to an amount of the resource available to the one or more users and a demand for the resource from the one or more users, wherein the demand is at least one of (i) the first set of anticipated demand, and (ii) actual demand presented by the one or more users.

4. The method of claim 1, wherein all of the one or more capacities for providing the resource during the one or more of the plurality of time periods are equal.

5. The method of claim 1, wherein the prices are expressed in at least one of (i) dollars, (ii) other government provided currencies, and (iii) spendable units other than government provided currency.

6. The method of claim 1, wherein the determining of the first set of anticipated demands is according to a model of utility to the one or more users of using the resource during the each of the plurality of time periods.

7. The method of claim 6, wherein the model of utility comprises for the each of the plurality of time periods:
   a desirability factor of using the resource during the each of the plurality of time periods regardless of price for the resource;
   a price factor comprising the price for the resource during the each of the plurality of time periods; and
   a randomness factor for the each of the plurality of time periods, the randomness factor associated with random uncertainty of the one or more users in preferring the one or more certain periods.

8. The method of claim 7, wherein the model of utility is expressed as: $U_n(t)=\mu_t-p_t+\xi_{n,t}$, wherein n is an index indicating a user of the one or more users, t is an index indicating the one of the plurality of time periods, $U_n(t)$ is the utility for user n during time period t of the plurality of time periods, $\mu_t$ is the desirability factor, $p_t$ is the price factor, and $\xi_{n,t}$ is the randomness factor.

9. The method of claim 6, wherein the setting of the prices for the resource is according to at least one of (i) increasing composite utility to the one or more users of the resource, and (ii) maximizing the composite utility to the one or more users, the composite utility comprising the utility for each of the one or more users, wherein the utility for each of the one or more users is according to the model of utility.

10. The method of claim 1, wherein the uncertainty of the one or more users in preferring one or more certain time periods of a plurality of time periods is modeled according to a Gumbel distribution.

11. The method of claim 1, wherein the setting of the prices for the resource is according to at least one of: (i) increasing a number of users of the one or more users that receive the resource during a user desired one or more of the plurality of time periods; (ii) increasing a fulfillment rate of user requests for the resource during a specific time period of the plurality of time periods; (iii) increasing an average system utilization as a percent of capacity; (iv) increasing revenues obtained for providing the resource; and (v) increasing profits obtained for providing the resource.

12. The method of claim 11, wherein the user desired one or more of the plurality of time periods is according to: (i) a desirability factor of using the resource during the each of the plurality of time periods regardless of price for the resource; (ii) a price factor comprising the price for the resource during the each of the plurality of time periods; and (iii) a randomness factor for the each of the plurality of time periods, the randomness factor associated with random uncertainty of the one or more users in preferring the one or more certain periods.

13. A method of dynamic pricing of a computing resource, the method comprising:
   determining a first set of anticipated demands for one or more users to acquire the computing resource, wherein prices for the computing resource differ between at least two of a plurality of time periods for acquiring the computing resource and each anticipated demand of the first set is associated with a different one of the plurality of time periods;
   determining a second set of anticipated demands for the one or more users to acquire the computing resource when a constant price for the computing resource is the same for all of the plurality of time periods, each anticipated demand of the second set is associated with a different one of the plurality of time periods; and
   setting prices for the computing resource during each of the plurality of time periods according to the determined first set of anticipated demands and the determined second set of anticipated demands;
   wherein one or more of the determining of the first set of anticipated demands, the determining of the second set of anticipated demands and the setting of prices are implemented as instruction code executed on a processor device;
   wherein one or more anticipated demands of the second set associated with one or more of the plurality of time periods is greater than one or more capacities for providing the resource during the one or more of the plurality of time periods; and
   wherein the setting of the prices reduces anticipated demand from the one or more anticipated demands of the second set to be equal to or less than the one or more capacities.

14. The method of claim 13, wherein the determining of the first set of anticipated demands is according to uncertainty of the one or more users in preferring one or more certain time periods of the plurality of time periods for acquiring the computing resource.

15. The method of claim 13, further comprising determining an amount of currency to purchase computing resource to be allocated to the one or more users according to an amount of the computing resource available to the one or more users and a demand for the computing resource from the one or more users, wherein the demand is at least one of (i) the first set of anticipated demand, and (ii) actual demand presented by the one or more users.

16. The method of claim 13, wherein the determining of the first set of anticipated demands is according to a model of utility to the one or more users of using the resource during the each of the plurality of time periods.

17. The method of claim 16, wherein the model of utility comprises for the each of the plurality of time periods:
   a desirability factor of using the resource during the each of the plurality of time periods regardless of price for the resource;
   a price factor comprising the price for the resource during the each of the plurality of time periods; and
   a randomness factor for the each of the plurality of time periods, the randomness factor associated with random uncertainty of the one or more users in preferring the one or more certain periods.

18. The method of claim 17, wherein the model of utility is expressed as: $U_n(t)=\mu_t-p_t+\xi_{n,t}$, wherein n is an index indicating a user of the one or more users, t is an index indicating the one of the plurality of time periods, $U_n(t)$ is the utility for user n during time period t of the plurality of time periods, $\mu_t$ is the desirability factor, $p_t$ is the price factor, and $\xi_{n,t}$ is the randomness factor.

19. The method of claim 13, wherein the uncertainty of the one or more users in preferring one or more certain time periods of a plurality of time periods is modeled according to a Gumbel distribution.

20. A system for dynamic pricing of a resource, the system comprising:
   a demand projection module operative to:
      determine a first set of anticipated demands for one or more users to acquire the resource according to uncertainty of the one or more users in preferring one or more certain time periods of a plurality of time periods for acquiring the resource, wherein prices for the resource differ between at least two of the plurality of time periods and each anticipated demand of the first set is associated with a different one of the plurality of time periods; and
      determine a second set of anticipated demands for the one or more users to acquire the computing resource when a constant price for the computing resource is the same for all of the plurality of time periods, each anticipated demand of the second set is associated with a different one of the plurality of time periods;
   a resource pricing module operative to set prices for the resource during each of the plurality of time periods according to the determined first set of anticipated demands and the determined second set of anticipated demands; and
   a processor device configured to execute the demand projection module and the resource pricing module;
   wherein one or more of the determining of the first set of anticipated demands, the determining of the second set of anticipated demands and the setting of prices are implemented as instruction code executed on the processor device;
   wherein one or more anticipated demands of the second set associated with one or more of the plurality of time periods is greater than one or more capacities for providing the resource during the one or more of the plurality of time periods; and
   wherein the setting of the prices reduces anticipated demand from the one or more anticipated demands of the second set to be equal to or less than the one or more capacities.

21. Apparatus for dynamic pricing of a resource, the apparatus comprising:
   a memory; and
   a processor coupled to the memory and configured to:
      determine a first set of anticipated demands for one or more users to acquire the resource according to uncertainty of the one or more users in preferring one or more certain time periods of a plurality of time periods for acquiring the resource, wherein prices for the resource differ between at least two of the plurality of time periods and each anticipated demand of the first set is associated with a different one of the plurality of time periods;

determine a second set of anticipated demands for the one or more users to acquire the computing resource when a constant price for the computing resource is the same for all of the plurality of time periods, each anticipated demand of the second set is associated with a different one of the plurality of time periods; and set prices for the resource during each of the plurality of time periods according to the determined first set of anticipated demands and the determined second set of anticipated demands;

wherein one or more anticipated demands of the second set associated with one or more of the plurality of time periods is greater than one or more capacities for providing the resource during the one or more of the plurality of time periods; and wherein the setting of the prices reduces anticipated demand from the one or more anticipated demands of the second set to be equal to or less than the one or more capacities.

22. The apparatus of claim 21, wherein the determining of the first set of anticipated demands is according to a model of utility to the one or more users of using the resource during the each of the plurality of time period and wherein the model of utility comprises for the each of the plurality of time periods:

a desirability factor of using the resource during the each of the plurality of time periods regardless of price for the resource;

a price factor comprising the price for the resource during the each of the plurality of time periods; and a randomness factor for the each of the plurality of time periods, the randomness factor associated with random uncertainty of the one or more users in preferring the one or more certain periods.

23. An article of manufacture for dynamic pricing of a resource, the article comprising a non-transitory computer readable storage medium having one or more programs embodied therewith, wherein the one or more programs, when executed by a computer, perform the steps of:

determine a first set of anticipated demands for one or more users to acquire the resource according to uncertainty of the one or more users in preferring one or more certain time periods of a plurality of time periods for acquiring the resource, wherein prices for the resource differ between at least two of the plurality of time periods and each anticipated demand of the first set is associated with a different one of the plurality of time periods;

determine a second set of anticipated demands for the one or more users to acquire the computing resource when a constant price for the computing resource is the same for all of the plurality of time periods, each anticipated demand of the second set is associated with a different one of the plurality of time periods; and set prices for the resource during each of the plurality of time periods according to the determined first set of anticipated demands and the determined second set of anticipated demands;

wherein one or more anticipated demands of the second set associated with one or more of the plurality of time periods is greater than one or more capacities for providing the resource during the one or more of the plurality of time periods; and wherein the setting of the prices reduces anticipated demand from the one or more anticipated demands of the second set to be equal to or less than the one or more capacities.

* * * * *